United States Patent
Kyou et al.

(10) Patent No.: US 11,228,894 B2
(45) Date of Patent: Jan. 18, 2022

(54) WIRELESS COMMUNICATION APPARATUS, WIRELESS COMMUNICATION METHOD, AND STORAGE MEDIUM

(71) Applicant: CASIO COMPUTER CO., LTD., Tokyo (JP)

(72) Inventors: Kazuho Kyou, Tachikawa (JP); Sadao Nagashima, Tokorozawa (JP); Hiroshi Iwamiya, Ome (JP); Tsutomu Terazaki, Saitama (JP); Toshihiro Takahashi, Kunitachi (JP); Takahiro Tomida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 16/587,797

(22) Filed: Sep. 30, 2019

(65) Prior Publication Data
US 2020/0107179 A1    Apr. 2, 2020

(30) Foreign Application Priority Data
Oct. 2, 2018   (JP) .............................. JP2018-187684

(51) Int. Cl.
*H04W 8/00* (2009.01)
*H04W 76/14* (2018.01)
(Continued)

(52) U.S. Cl.
CPC ............. *H04W 8/005* (2013.01); *H04W 4/06* (2013.01); *H04W 4/80* (2018.02); *H04W 48/10* (2013.01);
(Continued)

(58) Field of Classification Search
CPC ....... H04W 8/005; H04W 4/06; H04W 76/14; H04W 48/14; H04W 12/108; H04W 4/08; H04W 48/12
See application file for complete search history.

(56) References Cited

U.S. PATENT DOCUMENTS 10,070,247 B2 *   9/2018   Batra .................... H04W 48/14
2018/0124731 A1 *  5/2018   Klotchkov ........ H04W 56/0015
(Continued)

FOREIGN PATENT DOCUMENTS

| JP | 2012142877 A | 7/2012 |
| JP | 2020010288 A | 1/2020 |

OTHER PUBLICATIONS

Extended European Search Report (EESR) dated Feb. 27, 2020 issued in counterpart European Application No. 19200494.3.
(Continued)

*Primary Examiner* — Hoi C Lau
(74) *Attorney, Agent, or Firm* — Holtz, Holtz & Volek PC (57) ABSTRACT

A wireless communication apparatus includes (i) a wireless communicator capable of broadcasting an extended advertising packet having a large transmittable capacity and a compatible advertising packet having a transmittable capacity smaller than the extended advertising packet, and (ii) a processor. The wireless communicator periodically broadcasts the extended advertising packet based on a command from the processor. The processor sets offset information for acquiring of a time at which the extended advertising packet is receivable in an offset notification packet that is the compatible advertising packet, and broadcasts the offset notification packet via the wireless communicator. The offset information is set based on a transmission timing of the offset notification packet and a transmission timing of the extended advertising packet.

10 Claims, 9 Drawing Sheets

(51) Int. Cl.
*H04W 4/06* (2009.01)
*H04W 68/00* (2009.01)
*H04W 4/80* (2018.01)
*H04W 48/10* (2009.01)
*H04W 56/00* (2009.01)

(52) U.S. Cl.
CPC ....... *H04W 56/003* (2013.01); *H04W 68/005* (2013.01); *H04W 76/14* (2018.02)

(56) References Cited

U.S. PATENT DOCUMENTS

| | | | |
|---|---|---|---|
| 2020/0044844 A1* | 2/2020 | Sridhara | H04W 12/108 |
| 2020/0100090 A1* | 3/2020 | Baik | H04W 8/005 |
| 2020/0107179 A1* | 4/2020 | Kyou | H04W 4/06 |
| 2020/0337049 A1* | 10/2020 | Di Marco | H04W 72/02 |

OTHER PUBLICATIONS

Anonymous, "Core System Package [Low Energy Controller volume]", Specification of the Bluetooth System Version 5.0, Dec. 6, 2016, vol. 6, pp. 2529-2790 XP055565840.

\* cited by examiner

WIRELESS COMMUNICATION APPARATUS, WIRELESS COMMUNICATION METHOD, AND STORAGE MEDIUM

CROSS-REFERENCE TO RELATED APPLICATION

This application claims the benefit of Japanese Patent Application No. 2018-187684, filed on Oct. 2, 2018, the entire disclosure of which is incorporated by reference herein.

FIELD

Technical field relates to a wireless communication apparatus, a wireless communication method, and a storage medium.

BACKGROUND

Bluetooth (registered trademark) low energy (BLE) is one short range wireless communication standard, and is known heretofore for use in establishing a connection between a slave device and a master device by the slave device broadcasting an advertising packet intermittently at a prescribed period in order for the master device to discover the slave device, as for example, in Unexamined Japanese Patent Application Kokai Publication No. 2012-142877.

Although heretofore a maximum of 31 bytes of advertising data can be placed in the advertising packet according to BLE (predating Bluetooth (registered trademark) 5), according to Bluetooth (registered trademark) 5 released in December of 2016, use of periodic advertising of an extended advertising packet (packet on a secondary advertising channel) is enabled, and thus broadcast transmission at intervals of a larger capacity of data is enabled by use of this extended advertising packet. For example, a maximum of about 20 Mbyte (2 Mbit×81.91875 seconds÷8=20.4796875 Mbyte) of data can be broadcast when using the low energy (LE) 2M physical layer (PHY) standard.

However, to receive the periodic advertising of the extended advertising packet, firstly the receiving side is to receive an ADV_EXT_IND advertising packet (packet of a primary advertising channel) that has compatibility with previously-existing BLE. Then although the frequency of transmission by periodic advertising can be set in a range of 7.5 milliseconds to 81.91875 seconds, the transmitting side transmits the advertising packet ADV_EXT_IND and the periodic advertising continuing thereafter at this frequency. Therefore, opportunities become infrequent for enabling reception of the advertising packet ADV_EXT_IND for the receiving side to receive the periodic advertising at this long frequency, and thus such operation suffers from lowering of the possibility that the periodic advertising can be received. For example, when this interval is set to 10 seconds, only one opportunity for receiving the advertising packet ADV_EXT_IND occurs in 10 seconds.

SUMMARY

A wireless communication apparatus according to a first aspect of the present disclosure includes (i) a wireless communicator capable of broadcasting an extended advertising packet of a large transmittable capacity and a compatible advertising packet having a smaller transmittable capacity than the extended advertising packet; and (ii) a processor. The wireless communicator broadcasts periodically the extended, advertising packet based on an instruction from the processor. The processor sets offset information for acquiring of a time at which the extended advertising packet is receivable in an offset notification packet that is the compatible advertising packet, and broadcasts the offset notification packet via the wireless communicator. The offset information is set based on a transmission timing of the offset notification packet and a transmission timing of the extended advertising packet.

A wireless communication apparatus according to a second aspect for achieving the aforementioned objective includes (i) a wireless communicator capable of receiving an extended advertising packet of a large transmittable capacity and a compatible advertising packet having a smaller transmittable capacity than the extended advertising packet, and (ii) a processor. The processor, via the wireless communicator, receives an offset notification packet that is the compatible advertising packet including offset information for acquiring a time at which the extended advertising packet is receivable, and receives the extended advertising packet via the wireless communicator based on the offset information included in the received offset notification packet.

BRIEF DESCRIPTION OF THE DRAWINGS

A more complete understanding of this application can be obtained when the following detailed description is considered in conjunction with the following drawings, in which.

DETAILED DESCRIPTION

Embodiments are described below with reference to drawings. Further, the same reference sign within the drawings is assigned for parts that are the same or equivalent.

Embodiment 1

Figure 1:
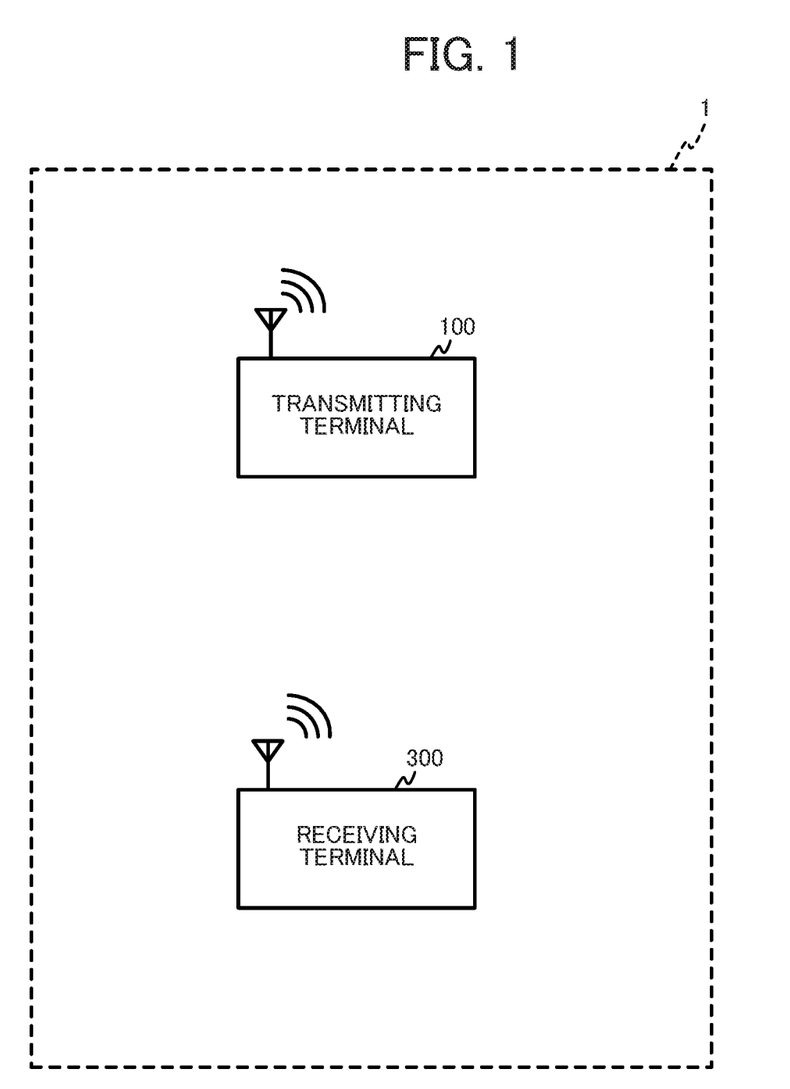
FIG. 1 illustrates a configuration example of a wireless communication system according to Embodiment 1.

As illustrated in FIG. 1, a wireless communication system 1 according to the present embodiment is equipped with a transmitting terminal 100 and a receiving terminal 300. The transmitting terminal 100 as well as the receiving terminal 300 are wireless communication apparatuses that perform wireless communication between each other on the basis of Bluetooth (registered trademark) low energy (referred to hereinafter as BLE). BLE is a standard (mode) instituted with an objective of low power consumption for the short range wireless communication standard termed Bluetooth (registered trademark). Further, in Embodiment 1, the transmitting terminal 100 and the receiving terminal 300 are taken to operate in accordance within Bluetooth (registered trademark) 5 (Bluetooth (registered trademark) core specification, version 5.0).

In the wireless communication system 1 according to Embodiment 1, the transmitting terminal 100 stores a large capacity of data, although no more than 20 MB in size, for which broadcast to the receiving terminal 300 is desired. The transmitting terminal 100 then broadcasts the large capacity of data by extended advertising packets. During this broadcasting, the transmitting terminal 100 broadcasts information about a time for transmission of the extended advertising packet using a compatible advertising packet that has compatibility with previously-existing BLE (preceding Bluetooth (registered trademark) 5), in order to increase probability that the receiving terminal 300 can receive the extended advertising packet. Due to such operation, the probability of the receiving terminal 300 being able to receive the extended advertising packet transmitted from the transmitting terminal 100 increases. Details of the wireless communication system 1 having such characteristics are described below.

The "extended advertising packet" is an advertising packet that is usable since Bluetooth (registered trademark) 5 and is capable of use in the broadcast of a large capacity of data. Further, the "compatible advertising packet" is an advertising packet that has compatibility with Bluetooth (registered trademark) that does not support Bluetooth (registered trademark) 5, and has a transmittable capacity smaller than that of the extended advertising packet. Although the compatible advertising packet has a small transmittable capacity, the transmission thereof is completed by transmission of a single packet. However, although the extended advertising packet has a large transmittable capacity, the transmission is not completed without the transmission of at least three packets.

Figure 2:
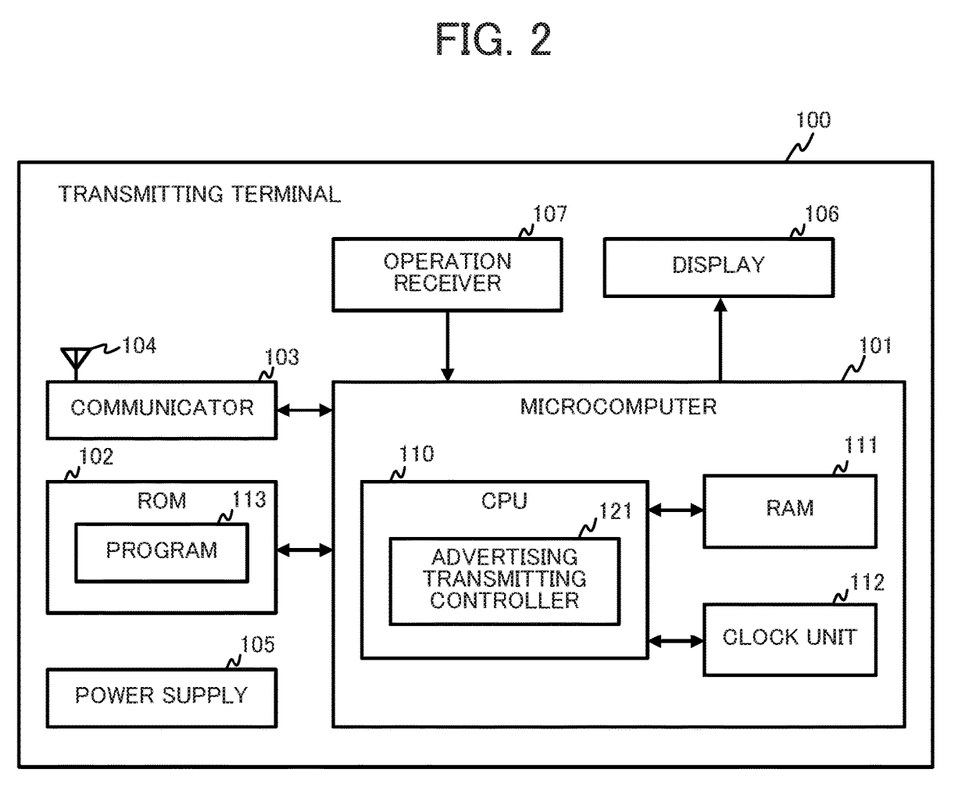
FIG. 2 is a block diagram illustrating configuration of a transmitting terminal according to Embodiment 1.

Firstly, hardware configuration of the transmitting terminal 100 according to Embodiment 1 is described. As illustrated in FIG. 2, the hardware configuration of the transmitting terminal 100 includes a microcomputer 101, a read only memory (ROM) 102, a communicator 103, an antenna 104, a power supply 105, a display 106, and an operation receiver 107.

The microcomputer 101 is equipped with components such as a central processing unit (CPU) 110 as a processor, a random access memory (RAM) 111 as storage, and a clock unit 112. The RAM 111 and the clock unit 112 are not limited to being located within the microcomputer 101, and these components may be provided exterior to the microcomputer 101. Further, the ROM 102, the communicator 103, the antenna 104, and the power supply 105 are not limited to being located exterior to the microcomputer 101, and these components may be provided within the microcomputer 101.

The CPU 110 performs various types of calculation processing, and is a processor that performs integrated control of overall operations of the transmitting terminal 100. The CPU 110 reads control programs from the ROM 102, loads the control programs in the RAM 111, and executes various types of calculation processing for calculation control, display, or the like of various types of functions. The CPU 110 controls the communicator 103, broadcasts signals such as advertising packets, performs data communication with other wireless communication apparatuses, such as the receiving terminal 300, or the like.

The RAM 111 is volatile memory such as static random access memory (SRAM) or dynamic random access memory (DRAM). The RAM 111 stores temporary data, various types of setting data, or the like.

The clock unit 112 is formed from components such as an oscillator circuit, a frequency divider circuit, and a clock circuit, and performs functions such as measuring the present time and clock synchronization with another wireless communication apparatus.

The ROM 102 is mask ROM and/or non-volatile memory such as flash memory, and stores control programs and/or initial setting data. The control programs include a program 113 for control of various types of processing for broadcasting of signals such as the advertising packet, and control of wireless communication with other wireless communication apparatuses such as the receiving terminal 300.

The communicator 103, for example, includes a radio frequency (RF) circuit or a baseband (BB) circuit, and a memory circuit, and is also termed a "wireless communicator". The communicator 103 demodulates, decodes, or the like the wireless signal received via the antenna 104, and sends the resultant signal to the CPU 110. Moreover, the communicator 103 performs operations such as encoding and modulating the signal sent from the CPU 110, and transmits the resultant signal to the outside via the antenna 104. In Embodiment 1, the communicator 103 is achieved by use of a Bluetooth (registered trademark) controller that performs transmitting and receiving of wireless signals on the basis of BLE of Bluetooth (registered trademark) 5.

The power supply 105, for example, is equipped with a battery and a voltage conversion circuit. The power supply 105 supplies power at the operational voltage of each of the components within the transmitting terminal 100.

The display 106 includes components such as a display panel such as a liquid crystal display (LCD) or an organic electro-luminescence (EL) display, and a driver for sending output to the display panel on the basis of a control signal from the microcomputer 101 in accordance with the type of the display panel. The display 106, for example, displays information such as a state of the transmitting terminal 100.

The operation receiver 107, for example, includes components such as sensors, buttons, and switches, receives an input operation from a user, and outputs to the microcomputer 101 an electrical signal in response to the input operation. For example, the operation receiver 107 may be configured as a touch panel display by combination with the display panel by providing touch sensors so as to overlap the display panel of the display 106.

In the aforementioned manner, the transmitting terminal 100 stores the large capacity data for broadcast to the receiving terminal 300. This large capacity data may be stored beforehand in the ROM 102, or may be acquired by the transmitting terminal 100 via the communicator 103 from an exterior device for storage in the RAM 111.

Figure 3:
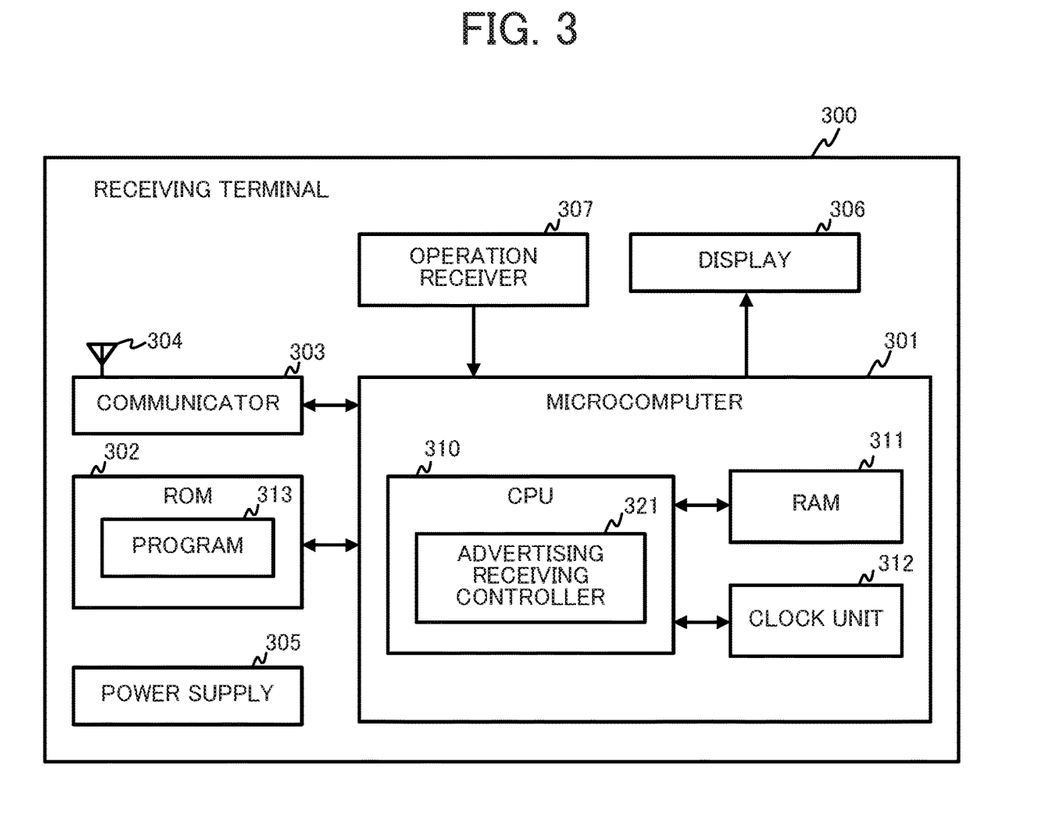
FIG. 3 is a block diagram illustrating configuration of a receiving terminal according to Embodiment 1.

Hardware configuration of the receiving terminal 300 according to Embodiment 1 is described below. As illustrated in FIG. 3, the hardware configuration of the receiving terminal 300 includes a microcomputer 301, a ROM 302, a communicator 303, an antenna 304, a power supply 305, a display 306, and an operation receiver 307. Examples of the receiving terminal 300 includes devices such as a smartphone.

The microcomputer 301 includes a CPU 310 as a processor, a RAM 311 as a storage, a clock unit 312, or the like. Furthermore, the RAM 311 and the clock unit 312 are not limited to location within the microcomputer 301, and these components may be provided exterior to the microcomputer 301. Moreover, the ROM 302, the communicator 303, the antenna 304, and the power supply 305 are not limited to location exterior to the microcomputer 301, and these components may be provided within the microcomputer 301.

The CPU 310 performs various types of calculation processing, and is a processor that performs integrated control of overall operations of the receiving terminal 300. The CPU 310 reads control programs from the ROM 302, loads the control programs in the RAM 311, and executes various types of calculation processing for calculation control, display, or the like of various types of functions. Moreover, the CPU 310 controls the communicator 303, receives and scans for signals such as advertising packets, performs data communication with other wireless communication apparatuses, such as the transmitting terminal 100, or the like.

The RAM 311 is volatile memory such as SRAM or DRAM. The RAM 311 stores data such as temporary data and various types of setting data.

The clock unit 312 is formed from components such as an oscillator circuit, a frequency divider circuit, and a clock circuit, and performs functions such as measuring the present time and clock synchronization with another wireless communication apparatus.

The ROM 302 is non-volatile memory such as mask ROM or flash memory, and stores information such as control programs and initial setting data. The control programs include a program 313 for control of various types of processing for broadcasting of signals such as the advertising packet, and control of wireless communication with other wireless communication apparatuses such as the transmitting terminal 100.

The communicator 303, for example, includes a radio frequency (RF) circuit or a baseband (BB) circuit, and a memory circuit. The communicator 303 demodulates, decodes, or the like the wireless signal received via the antenna 304, and sends the resultant signal to the CPU 310. Moreover, the communicator 303 performs operations such as encoding and modulating the signal sent from the CPU 310, and transmits the resultant signal to the outside via the antenna 304. In Embodiment 1, the communicator 303 is achieved by use of a Bluetooth (registered trademark) controller that performs transmitting and receiving of wireless signals on the basis of BLE of Bluetooth (registered trademark) 5.

The power supply 305, for example, is equipped with a battery and a voltage conversion circuit. The power supply 305 supplies power at the operational voltage of each of the components within the receiving terminal 300.

The display 306 includes components such as a display panel such as a liquid crystal display (LCD) or an organic EL display, and a driver for sending output to the display panel on the basis of a control signal from the microcomputer 301 in accordance with the type of the display panel. The display 306, for example, displays information such as information received from the transmitting terminal 100.

The operation receiver 307 receives an input operation from a user, and outputs to the microcomputer 301 an electrical signal in response to the input operation. For example, the operation receiver 307 may be configured as a touch panel display by combination with the display panel by providing touch sensors so as to overlap the display panel of the display 306.

The communicator 103 of the transmitting terminal 100 as well as the communicator 303 of the receiving terminal 300 are achieved by use of a Bluetooth (registered trademark) controller that performs transmitting and receiving of wireless signals on the basis of BLE of Bluetooth (registered trademark) 5, and thus a supplementary description of BLE is provided.

In accordance with BLE, communication is performed using 40 channels obtained by dividing the frequency band region of 2.4 GHz to 2.48 GHz into channels of 2 MHz width. These 40 channels are allocated channel numbers from channel 0 to channel 39. In accordance with previously-existing BLE (non-compliant with Bluetooth (registered trademark) 5), among these 40 channels, channel 0 through channel 36 are used for data communication, and channel 37 through channel 39 are used for transmission of the advertising packet.

Although channel 0 through channel 36 are capable of being used for transmitting and receiving of the extended advertising packet in Bluetooth (registered trademark) 5, transmission of the initial advertising packet is performed using one of channel 37 through channel 39 for compatibility with previously-existing BLE. Further, channel 37 through channel 39 are termed primary channels, and channel 0 through channel 36 are termed secondary channels. That is, the compatible advertising packet that is compatible with previously-existing BLE is broadcast by use of the primary channels, and the extended advertising packet is broadcast by use of the secondary channels.

Functional configuration of the CPU 110 of the transmitting terminal 100 according to Embodiment 1 is described next. As illustrated in FIG. 2, the CPU 110 functions as an advertising transmitting controller 121. The functions of the advertising transmitting controller 121 may be achieved by a processor other than the microcomputer 101, such as the CPU of the communicator 103.

The CPU 110, as the advertising transmitting controller 121, broadcasts the large capacity data stored in the ROM 102 or the RAM 111 by periodic advertising via the communicator 103. Specifically, after setting for the communicator 103 parameters, advertising data, or the like for broadcasting using periodic advertising, by commanding the start of transmission of the extended advertising packet, the CPU 110 starts broadcasting by periodic advertising.

Here, the expression "periodic advertising" refers to a function for periodically broadcasting the advertising packet, and this function is newly added to Bluetooth (registered trademark) 5. The broadcast transmission by periodic advertising is performed using a packet AUX_SYNC_IND packet and a packet AUX_CHAIN_IND that are extended advertising packets newly added to Bluetooth (registered trademark) 5.

However, in order to assure compatibility with previously-existing BLE (non-compliant with Bluetooth (registered trademark) 5), this results in a scheme by which, rather than transmitting the packet AUX_SYNC_IND from the start, normally the advertising packet ADV_EXT_IND is firstly transmitted using a primary channel (one of channel 37 through channel 39) with compliance also for previously-existing BLE; thereafter, the extended advertising packet AUX_ADV_IND is transmitted on the secondary channel (one of channel 0 through cannel 36) designated by the extended advertising packet AUX_ADV_IND; and thereafter, the extended advertising packet AUX_SYNC_IND is transmitted at a timing and on a channel designated in the extended advertising packet AUX_SYNC_IND.

Data incapable of being transmitted by the extended advertising packet AUX_SYNC_IND alone can be transmitted by continuing by using the extended advertising packet AUX_CHAIN_IND. After the extended advertising packet AUX_SYNC_IND (and AUX_CHAIN_IND), during transmission of the continuing data using the extended advertising packet AUX_CHAIN_IND, a MoreData bit within the extended advertising packet AUX_SYNC_IND (and the packet AUX_CHAIN_IND) is set to "1" as a flag indicating the existence of a continuation.

Although Bluetooth (registered trademark) 5 is a specification that transmits the advertising packet ADV_EXT_IND on the primary channel in order to provide notification of the timing (time of transmission) at which the extended advertising packet is transmitted by periodic advertising, when the receiving side fails to receive this advertising packet ADV_EXT_IND, the extended advertising packet cannot be received by periodic advertising until the next interval.

Therefore, in Embodiment 1, the CPU 110 as the advertising transmitting controller 121, in the period in which broadcasting by periodic advertising is performed, separately from the transmitting of the advertising packet ADV_EXT_IND, also broadcasts the compatible advertising packets (ADV_NONCONN_IND and ADV_SCAN_IND, referred to hereinafter as the "offset notification packets") that have compatibility with the previously-existing BLE and that include information (offset information) for the time at which the extended advertising packet of the periodic advertising is transmitted. Due to operation in this manner, even when the receiving side (receiving terminal 300) fails to receive the advertising packet ADV_EXT_IND, if this offset notification packet can be received, receiving of the extended advertising packet by periodic advertising is enabled. The receiving terminal 300, by below-described advertising reception control processing, constantly scans for broadcast advertising packets.

Figure 4:
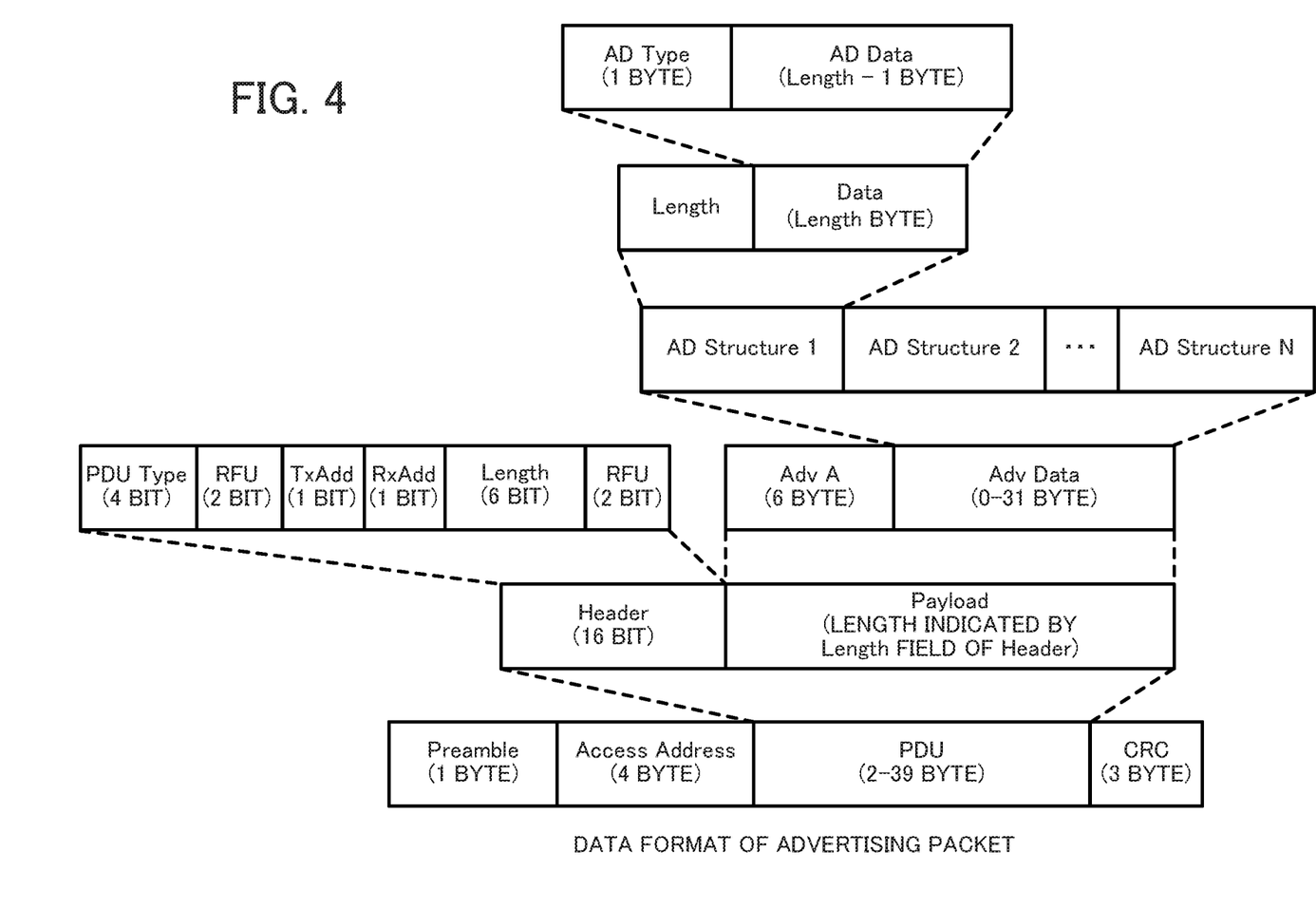
FIG. 4 is a drawing for description of a data format of an advertising packet.

In order to describe the data format of this offset notification packet, firstly the data format of the advertising packet transmitted on the primary channel is illustrated in FIG. 4. A protocol data unit (PDU) of the advertising packet occurring in the link layer has a size of 2 to 39 bytes, and includes a 2 byte header and a maximum of 37 byte of payload. The type of the advertising packet, such as ADV_EXT_IND or ADV_NONCONN_IND, is designated by a PDU Type within the header. Furthermore, the payload includes a 6 byte advertising address (Adv A) indicating an address of the transmitting terminal 100 and advertising data (Adv Data) having a maximum of 31 bytes.

The maximum size of the advertising data is 31 bytes due to the restriction on the size of the payload of a single packet. The advertising data includes a freely-selected number (although the number is in a range that does not exceed the maximum 31 byte size of the advertising data) of an AD Structure that is formed from a length and data. The data included in the AD structure includes a respective AD Type and AD Data. Each AD Type indicates the type of the AD Data. For example, the AD Type of 0xFF is "Manufacturer Specific Data". In the case in which the AD Type is the "Manufacturer Specific Data", the content of the AD Data includes a "Company ID" for specifying the company and data freely-determined by the company.

Figure 5:
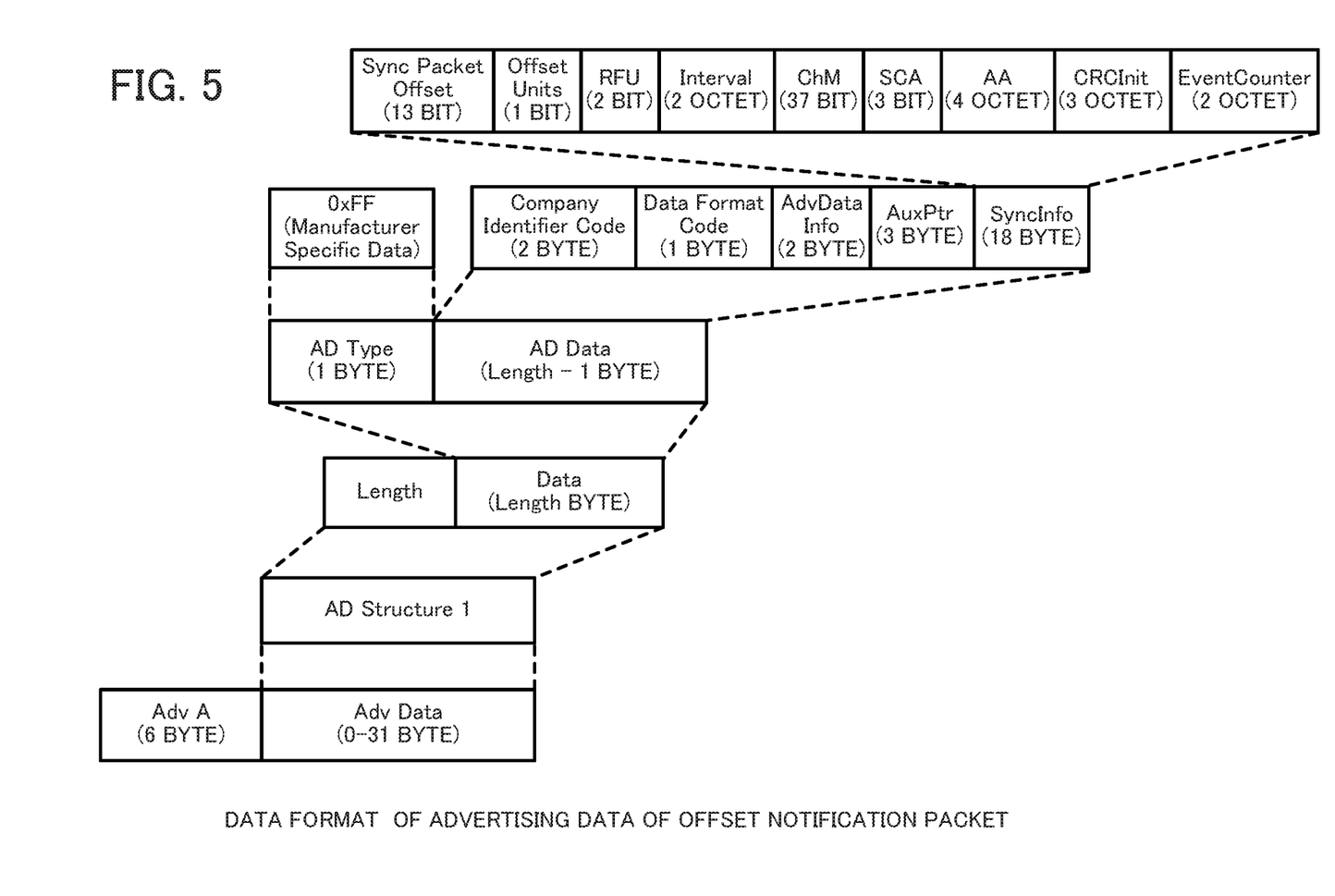
FIG. 5 is a drawing for description of a data format of advertising data of an offset notification packet according to Embodiment 1.

For the offset notification packet used in Embodiment 1, the PDU Type is ADV_NONCONN_IND or ADV_SCAN_IND, and the data format of the advertising data is that of the advertising packet of the content illustrated in FIG. 5.

Here, the AD Type is 0xFF, indicating "Manufacturer Specific Data". Moreover, the code ("Company ID" for distinguishing between companies) allocated to a company is used for the company identifier code. The data format code is secured for future extension, and although this code may be set to a freely-selected value, this code is set to 1, for example, in this embodiment.

The AdvDataInfo includes information such as an identifier (ID) of the advertising data, and is used for applications such as preventing double-receiving of the advertising data. Moreover, AuxPtr includes information such as the transmission channel, the transmission timing, a utilized PHY, or the like of an extended advertising packet AUX_ADV_IND to be transmitted thereafter. Although these AdvDataInfo and AuxPtr are transmitted in the advertising packet ADV_EXT_IND, data in an offset notification packet is also set to be identical to such data. Due to such configuration, even when the receiving side is unable to receive the packet ADV_EXT_IND, if the offset notification packet can be received, acquisition is possible of such data (AdvDataInfo and AuxPtr), and the extended advertising packet can be received.

The SyncInfo includes information related to the transmission channel, the transmission timing, or the like of the extended advertising packet AUX_SYNC_IND to be transmitted afterwards. More specifically, as illustrated in FIG. 5, this SyncInfo includes a sync packet offset, offset units, reserved for future use (RFU) information, an interval, a channel map (ChM), a sleep clock accuracy (SCA), an access address (AA), a cyclic redundancy check initialization value (CRCInit), and an event counter.

The sync packet offset and the offset unit are set to offset information that indicates a time (offset value) until transmission of the extended advertising packet AUX_SYNC_IND immediately after the transmission timing of this offset notification packet. Specifically, this time is a value obtained by multiplying the value of the sync packet offset by the unit set by the offset unit (30 μs or 300 μs). Moreover, the value obtained by multiplying the interval by 1.25 milliseconds indicates the time period until the start packet (AUX_SYNC_IND) of the next interval after the start of the start packet (AUX_SYNC_IND) of the periodic advertisement, that is, indicates the period of a single interval.

The ChM and the event counter are used for calculation of the secondary channel used for the transmission of the extended advertising packet AUX_SYNC_IND. Specifically, this secondary channel is calculated, from the ChM and the event counter, by using channel selection algorithm #2 as specified in BLE.

Although such data of the SyncInfo is nearly the same as the data of the SyncInfo transmitted using the extended advertising packet AUX_ADV_IND transmitted after the packet ADV_EXT_IND, the values of the sync packet offset and the offset unit differ. The values of the sync packet offset and the offset unit are set for the time (offset value) until transmission of the next packet AUX_SYNC_IND after the timing of transmission of this offset notification packet. Since there are three primary channels, in the case of transmission of this offset notification packet on all three such channels, the offset values are set to different sync packet offsets and offset units in accordance with the transmission timings of the offset notification packets.

Although the offset notification packet is described above in detail, the offset notification packet can be described simply as a compatible advertising packet that includes information about the transmission timing and/or transmission channel of the extended advertising packet AUX_SYNC_IND transmitted periodically. Even though the receiving side may be unable to receive the advertising packet ADV_EXT_IND, the receiving of the extended advertising packet AUX_SYNC_IND can be possible by the receiving of this offset communication packet.

Functional configuration of the CPU 310 of the receiving terminal 300 according to Embodiment 1 is described below. As illustrated in FIG. 3, the CPU 310 functions as an advertising receiving controller 321. The functions of the advertising receiving controller 321 may be realized by using the CPU of the communicator 303, or a processor other than the microcomputer 301.

The CPU 310, as the advertising receiving controller 321, controls the communicator 303 to receive the advertising packet ADV_EXT_IND or the offset notification packet (ADV_NONCONN_IND or ADV_SCAN_IND) broadcast from the transmitting terminal 100. Then the CPU 310, on the basis of the information included in these received packets, receives the extended advertising packet AUX_SYNC_IND (and AUX_CHAIN_IND).

Specifically, by setting settings of the communicator 303 such as parameters and commanding the start of scanning, the CPU 310 causes the start of scanning for the broadcast advertising packet. Then upon receiving of a compatible advertising packet during the scanning, the communicator 303 sends to the CPU 310 an extended advertising report, and upon receiving the extended advertising packet, sends the extended advertising report. Moreover, after receiving the command from the CPU 310 to start a periodic scan, upon reception of the extended advertising packets (AUX_SYNC_IND and AUX_CHAIN_IND) of the periodic advertising, the communicator 303 sends to the CPU 310 the periodic advertising report.

Figure 6:
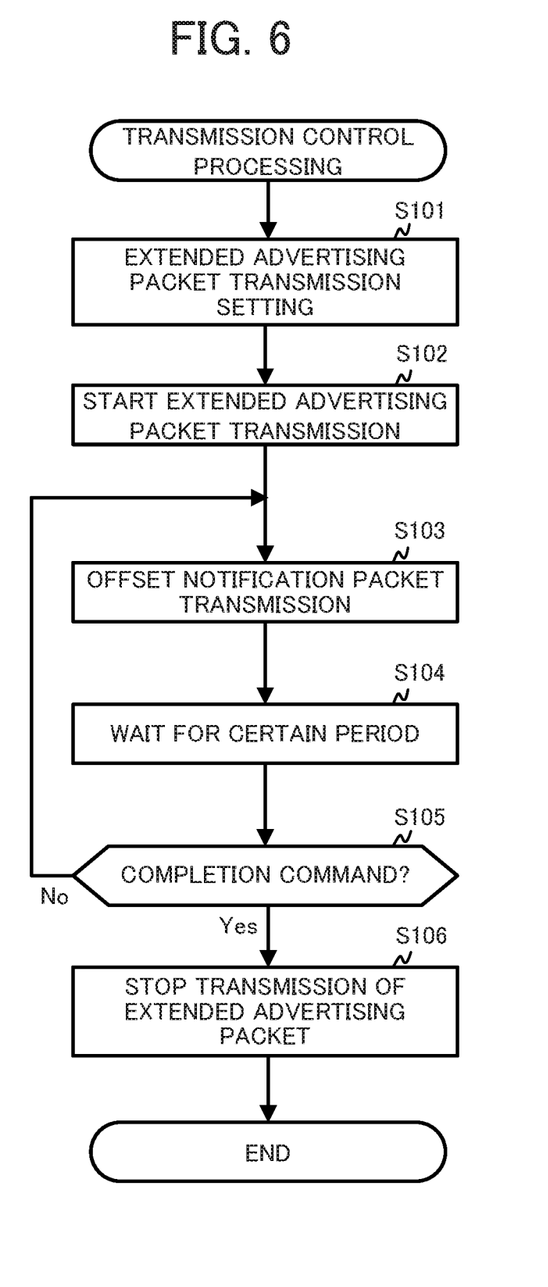
FIG. 6 is an example of a flowchart of transmission control processing executed by a CPU of the transmitting terminal according to Embodiment 1.

Operation of the transmitting terminal 100 according to the Embodiment 1 is described next with reference to FIG. 6. FIG. 6 is an example of a flowchart illustrating transmission control processing executed by the CPU 110 of the transmitting terminal 100 according to the Embodiment 1. The CPU 110 starts this processing upon the user performing an operation, or upon reaching a certain time, for example. Moreover, the transmitting terminal 100 stores the large capacity data for which broadcasting to the receiving terminal 300 is desired.

Firstly, the CPU 110 sets the communicator 103 to perform transmission of this large capacity data by broadcasting using the extended advertising packet (periodic advertising) (step S101). Then the CPU 110 commands the communicator 103 to start the transmission of the extended advertising packet (periodic advertising) (step S102). The communicator 103 is compliant with the Bluetooth (registered trademark) 5 specification, and thus upon receiving the command from the CPU 110, periodically broadcasts the packets ADV_EXT_IND, AUX_ADV_IND, and AUX_SYNC_IND (and AUX_CHAIN_IND as may be required).

Next, the CPU 110 performs broadcast transmission of the offset notification packet via the communicator 103 (step S103). At this time, after setting offset information indicating a time (offset value) until the next extended advertising packet AUX_SYNC_IND is broadcast after the transmission timing of the offset notification packet to the sync packet offset and the offset unit of the SyncInfo of this offset notification packet, the CPU 110 sends a command to the communicator 103 to broadcast the offset notification packet. Rather than the CPU 110 setting this offset information, the communicator 103 may be set to the sync packet offset and the offset unit of the SyncInfo prior to transmission of the offset notification packet.

Next, the CPU 110 waits for a certain period, as for example, a period set to the interval of the SyncInfo (step S104). When this certain period is set to a short value, the transmission frequency of the offset notification packet increases, and the probability that the receiving terminal 300 can receive the offset notification packet (that is, probability of being able to receive the following extended advertising packet) increases.

Next, the CPU 110 determines whether a completion command is issued (step S105). The completion command is issued due to an instruction from the user or after passage of a certain period. If the completion command is not issued (NO in step S105), processing returns to step S103, and the broadcasting of the offset notification packet and the waiting for the certain period are repeated. When the completion command is issued (YES in step S105), the CPU 110 sends a command to the communicator 103 to stop transmission of the extended advertising packet (periodic advertising) (step S106), and the present processing ends.

In the aforementioned processing, the communicator 103 is assumed to start periodic broadcasting of the extended advertising packet (AUX_SYNC_IND or the like) by the CPU 110 in step S102 commanding the communicator 103 to start transmission of the extended advertising packet (periodic advertising). However, the broadcasting of the extended advertising packet (AUX_SYNC_IND or the like) is not limited to such processing. For example, rather than the communicator 103 independently periodically broadcasting the extended advertising packet (AUX_SYNC_IND or the like), after the CPU 110 transmits the offset notification packet via the communicator 103 in step S103, on the basis of the transmission timing of this offset notification packet and the offset information included in this offset notification packet, the CPU 110 may broadcast the extended advertising packet (AUX_SYNC_IND or the like) via the communicator 103.

Figure 7:
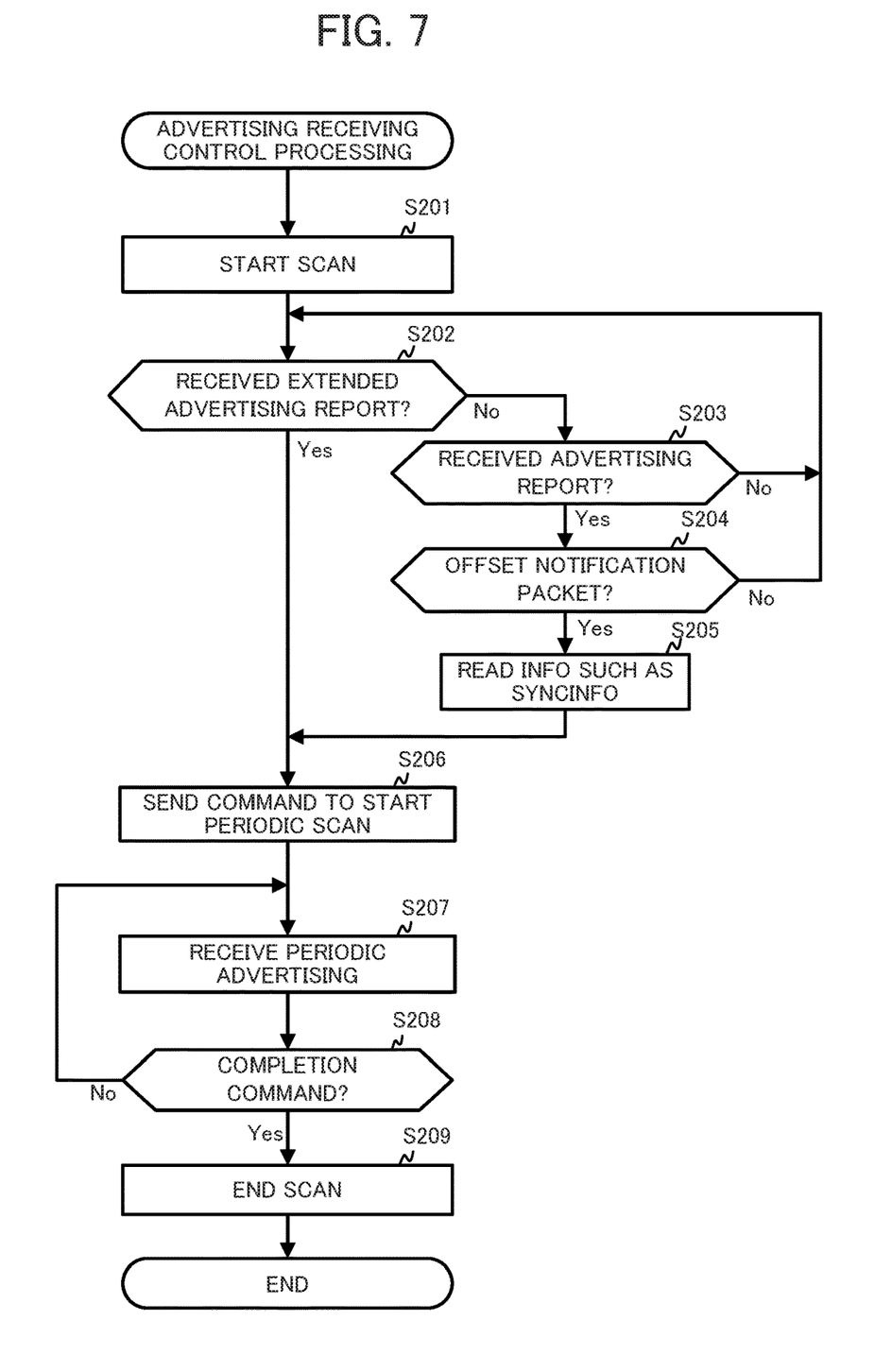
FIG. 7 is an example of a flowchart of advertising reception control processing executed by a CPU of the receiving terminal according to Embodiment 1.

Operation of the receiving terminal 300 according to Embodiment 1 is described next with reference to FIG. 7. FIG. 7 is an example of a flowchart illustrating advertising reception control processing executed by the CPU 310 of the receiving terminal 300 according to Embodiment 1. The CPU 310 starts the present processing upon the user performing an operation, for example.

Firstly, the CPU 310 sets settings of the communicator 303 such as scan parameters to start scanning of the advertising packet (step S201). Then the CPU 310 determines whether the extended advertising report is received from the communicator 303 (step S202). Further, upon reception of the advertising packet ADV_EXT_IND, the communicator 303 sends the extended advertising report to the CPU 310.

If the extended advertising report is not received (NO in step S202), the CPU 310 determines whether the advertising report is received from the communicator 303 (step S203). Upon receiving of the compatible advertising packet, such as the packet ADV_NONCONN_IND or even the offset notification packet that is one compatible advertising packet, the communicator 303 transmits the advertising report to the CPU 310.

If the advertising report is not received (NO in step S203), processing returns to step S202. If the advertising report is received (YES in step S203), determination is made as to whether the received compatible advertising packet is the offset notification packet (step S204). This determination can be performed by determining whether the PDU type is ADV_NONCONN_IND or ADV_SCAN_IND, whether the AD Type is 0xFF, whether the company identifier code of the AD Data matches the company ID, and whether the data format code is a prescribed value, such as 1.

If the received packet is not the offset notification packet (NO in step S204), processing returns to step S202. When the received packet is the offset notification packet (YES in step S204), the CPU 310 reads the AdvDataInfo, the AuxPtr, and the SyncInfo included in the offset notification packet (step S205), and on the basis of these parameters, sends a command to the communicator 303 to start the periodic scan (step S206).

However, if the extended advertising report is received in step S202 (YES in step S202), the CPU 310 sends a command to the communicator 303 to start the periodic scan in accordance with the normal communication sequence (step S206).

Then the CPU 310 receives the extended advertising packets (AUX_SYNC_IND and AUX_CHAIN_IND) of the periodic advertising via the communicator 303 (step S207).

Then the CPU 310 determines whether the completion command is issued (step S208). The completion command is issued by an instruction from the user or by passage of a prescribed period. When the completion command is not issued (NO in step S208), processing returns to step S207, and the receiving of the extended advertising packets (AUX_SYNC_IND and AUX_CHAIN_IND) of the periodic advertising is repeated. When the completion command is issued (YES in step S208), the CPU 310 stops scanning for the advertising packet (step S209), and the present processing ends.

Due to the aforementioned processing, even if the receiving terminal 300 fails to receive the advertising packet ADV_EXT_IND, if receiving of the offset notification packet is possible, then the terminal 300 can receive the extended advertising packet by periodic advertising.

Figure 8:
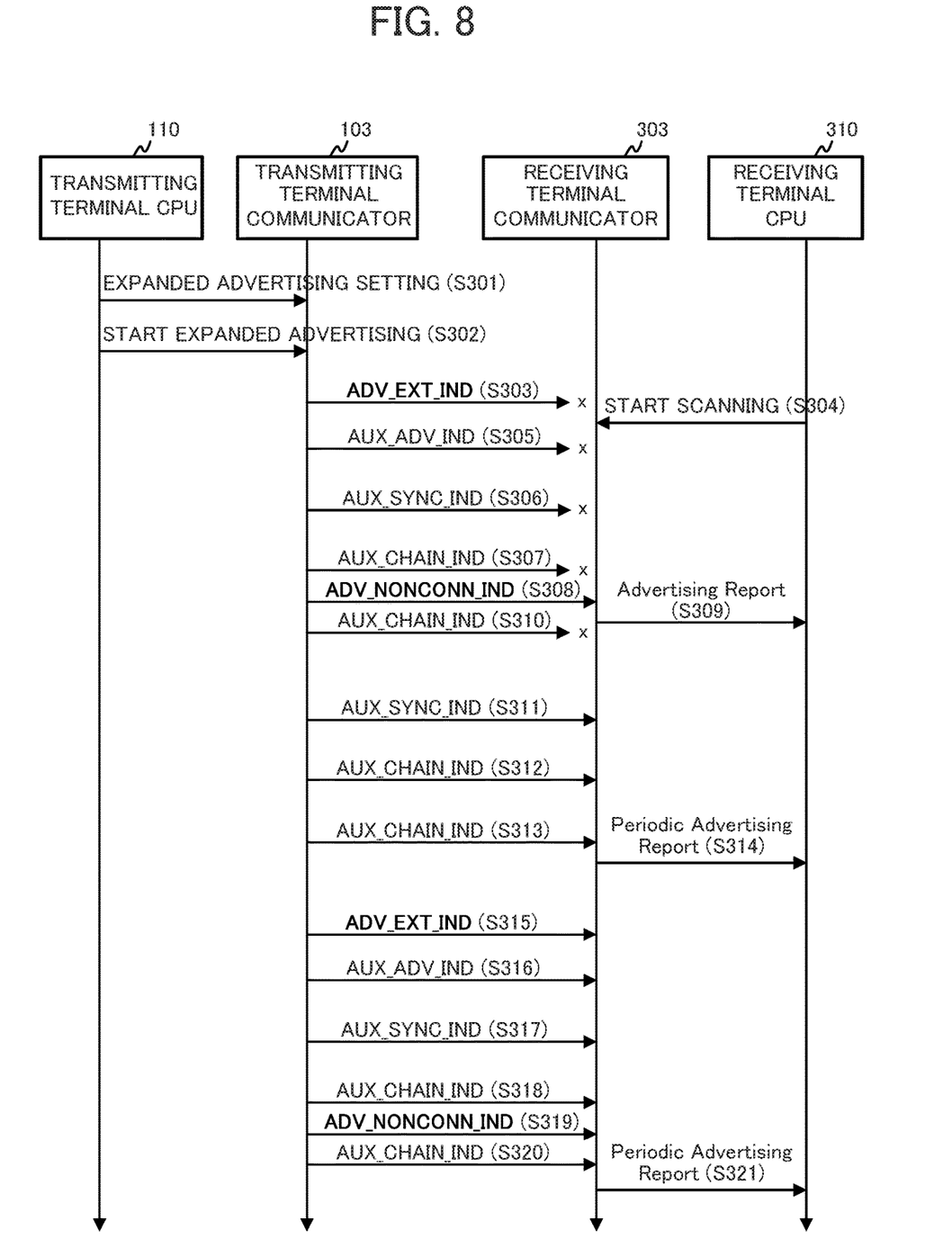
FIG. 8 is a sequence diagram illustrating an example of an advertising operation of the wireless communication system according to Embodiment 1.

Operation of the wireless communication system 1 according to Embodiment 1 is described next with reference to FIG. 8. In FIG. 8, an example of operation of the transmitting terminal 100 and the receiving terminal 300 is illustrated by a sequence diagram.

Firstly, the CPU 110 of the transmitting terminal 100 performs setting of the communicator 103 to settings for broadcasting of large capacity data using the extended advertising packets (periodic advertising) (step S301). Then the CPU 110 sends to the communicator 103 a command to start transmission of the extended advertising packet (periodic advertising) (step S302).

At this time, the communicator 103 periodically performs broadcasting of the packet ADV_EXT_IND (step S303), broadcasting of the packet AUX_ADV_IND (step S305), broadcasting of the packet AUX_SYNC_IND (step S306), and broadcasting of the packet AUX_CHAIN_IND (step S307 and step S310). Moreover, the CPU 110 also performs transmission of the offset notification packet via the communicator 103 (step S308).

The CPU 310 of the receiving terminal 300 sends to the communicator 303 a command to start scanning (step S304). Due to such operation, the communicator 303 can receive the broadcast advertising packet. However, the timing of the start of scanning is later than the timing of the broadcast of the packet ADV_EXT_IND (step S303), and thus the receiving terminal 300 cannot receive the packet ADV_EXT_IND of step S303. Then due to inability to receive the packet ADV_EXT_IND, the receiving terminal 300 is unable to receive the packet AUX_ADV_IND of step S305, and as a result, is unable to receive the packet AUX_SYNC_IND of step S306, the packet AUX_CHAIN_IND of step S307, and the packet AUX_CHAIN_IND of step S310.

However, the receiving terminal 300 can receive the offset notification packet that is the compatible advertising packet (step S308), and the communicator 303 sends the advertising report to the CPU 310 (step S309).

Then on the basis of information such as the SyncInfo included in the offset notification packet, the CPU 310 sends a command to the communicator 303 to start the periodic scan, the communicator 303 receives the packet AUX_SYNC_IND (step S311), and performs the receiving of the packet AUX_CHAIN_IND (step S312) and the receiving of the packet AUX_CHAIN_IND (step S313).

Then the communicator 303 transmits to the CPU 310 the periodic advertising report (step S314) in order to provide to the CPU 310 notification of reception of the extended advertising packet of such periodic advertising.

Thereafter, the communicator 103 of the transmitting terminal 100 periodically broadcasts the packet ADV_EXT_IND (step S315), broadcasts the packet AUX_ADV_IND (step S316), broadcasts the packet AUX_SYNC_IND (step S317), and broadcasts the packet AUX_CHAIN_IND (step S318 and step S320). Moreover, the CPU 110 performs transmission of the offset notification packet via the communicator 103 (step S319).

Then due to the performing of periodic scan by the communicator 303 of the receiving terminal 300, even in the event that the receiving of the packet ADV_EXT_IND in step S315 or the receiving of the packet AUX_ADV_IND of step S316 fails, the receiving of the packet AUX_SYNC_IND in step S317, the receiving of the packet AUX_CHAIN_IND in step S318, and the receiving of the packet AUX_CHAIN_IND in step S320 can be performed, and the periodic advertising report is sent to the CPU 310 (step S321).

In the aforementioned manner, by the transmitting terminal 100 periodically transmitting the offset notification packet, the wireless communication system 1 according to Embodiment 1 can increase the possibility that the receiving terminal 300 can receive the extended advertising packets (AUX_SYNC_IND and AUX_CHAIN_IND).

However, if the transmitting terminal 100 does not perform the offset notification packet transmission in FIG. 8 (step S308), for example, the receiving terminal 300 cannot receive the extended advertising packets (AUX_SYNC_IND and AUX_CHAIN_IND) until reception of the packet ADV_EXT_IND of step S315. However, by the transmitting terminal 100 performing the transmission of the offset notification packet (step S308) in Embodiment 1, the receiving terminal 300 can receive the extended advertising packets (AUX_SYNC_IND and AUX_CHAIN_IND) from step S311. That is, the receiving terminal 300 can expedite the timing of receiving of the extended advertising packets (AUX_SYNC_IND and AUX_CHAIN_IND).

Moreover, even though the width of the scan window during scanning is narrowed, the receiving terminal 300 is highly likely to receive either the packet ADV_EXT_IND or the extended advertising packets (AUX_SYNC_IND and AUX_CHAIN_IND), and thus power consumption can be decreased by setting the scanning window to a narrow width.

Modified Example 1

Figure 9:
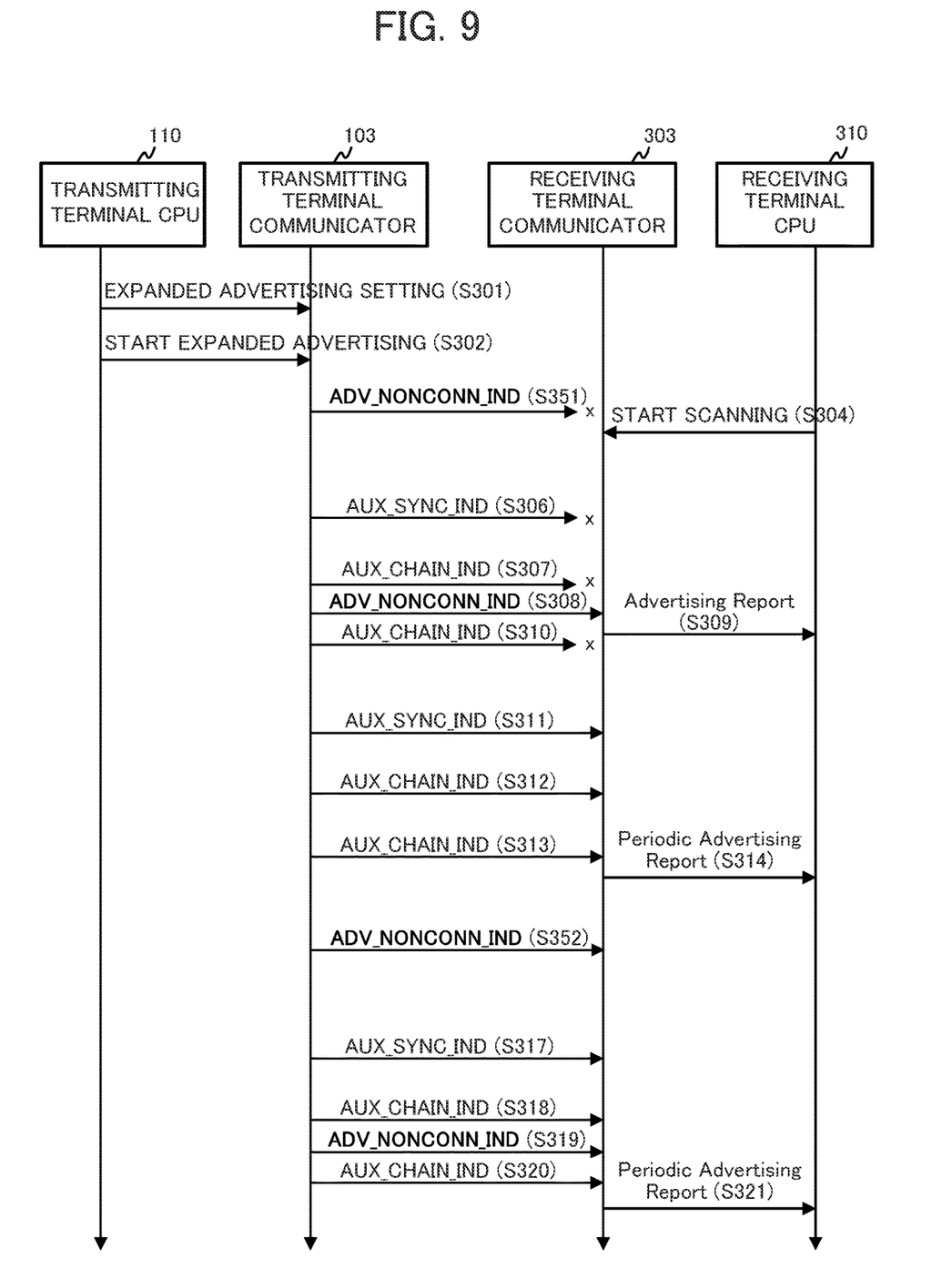
FIG. 9 is a sequence diagram illustrating an example of an advertising operation of a wireless communication system according to Modified Example 1.

Even without being able to receive the packet ADV_EXT_IND or the packet AUX_ADV_IND, the receiving terminal 300 in the aforementioned Embodiment 1 can acquire information included in such packets from the offset notification packet, and thus Modified Example 1 can be conceived in which the packet ADV_EXT_IND is not transmitted, but rather the offset notification packet is transmitted instead. An example of operation of such a wireless communication system 1 is illustrated as Modified Example 1 in FIG. 9. In FIG. 9, the transmitting terminal 100 transmits the offset notification packet rather than the packets ADV_EXT_IND and AUX_ADV_IND.

The offset notification packet of step S351 in FIG. 9 precedes the scanning start (step S304) and thus cannot be received by the receiving terminal 300. However, due to the offset notification packet of step S308, the advertising report is send from the communicator 303 to the CPU 310 (step S309), and the receiving terminal 300 begins the periodic scan. Due to such operation, the receiving terminal 300 can receive the extended advertising packets (AUX_SYNC_IND and AUX_CHAIN_IND) from step S311.

In Modified Example 1, the information of two packets (ADV_EXT_IND and AUX_ADV_IND) can be transmitted using a single packet (offset notification packet), and thus utilization efficiency of the electromagnetic waves increases. Moreover, when either of the two packets (ADV_EXT_IND and AUX_ADV_IND) cannot be received in Embodiment 1, although the extended advertising packets (AUX_SYNC_IND and AUX_CHAIN_IND) thereafter cannot be received, by using the offset notification packet, the extended advertising packets (AUX_SYNC_IND and AUX_CHAIN_IND) thereafter can be received merely by receiving this single offset notification packet, thereby enabling an increase is the reliability of reception of the periodic advertising packets (AUX_SYNC_IND and AUX_CHAIN_IND).

Modified Example 2

The transmitting terminal 100 may use the compatible advertising packet (ADD_NONCONN_IND or ADD_SCAN_IND) to broadcast the transmission frequency of the offset notification packet, and the receiving terminal 300 receiving this compatible advertising packet may set the scan window at the time of scanning to a narrow value on the basis of the transmission frequency of the offset notification packet. Such operation is described below in Modified Example 2.

In this case, for the compatible advertising packet for broadcasting the transmission frequency of the offset notification packet, for example, the AD Type may be set to 0xFF, the data format code of the AD Data may be set to 2, for example, so as to avoid overlapping the offset notification packet, and information on the frequency of transmission of the offset notification packet may be included in the AD Data rather than in the Adv Data Info, the AuxPtr, and the SyncInfo. The compatible advertising packet configured in this manner is termed the "transmission frequency notification packet".

Then upon receiving the transmission frequency notification packet, on the basis of the information on the transmission frequency included in the transmission frequency notification packet, the receiving terminal 300 can change the width of the scan window at the time of scanning. Such operation enables a lowering of power consumption while avoiding failure to receive the offset notification packet.

In the above description of Embodiment 1, the transmitting terminal 100 and the receiving terminal 300 are equipped respectively with the clock units 112 and 312, and are devices equipped with a timing function. However, the clock units may be omitted from these devices if the devices are able to perform clock synchronization for performing communication by the communicator by BLE.

Moreover, the transmitting terminal 100 and the receiving terminal 300 may be freely-selected devices as long as these devices are equipped with communicators for performing transmitting and receiving of wireless signals on the basis of Bluetooth (registered trademark) 5 BLE. Examples of such devices are electronic devices such as smartphones, portable phones, personal computers (PCs), personal digital assistants (PDAs), electronic watches, and smart watches that are equipped with wireless communication functions based on BLE.

Moreover, in the aforementioned embodiment, an example is described of performance of the control operations by the CPUs 110 and 310. However, the control operations are not limited to software control via the CPUs 110 and 310. Part of all of the control operations may be performed by use of a hardware configuration using hardware such as dedicated logic circuits.

Moreover, in the above description, an example is cited of use of the ROM 102 and 302 formed from non-volatile memory such as flash memory as the computer-readable medium for storing the programs 113 and 313 according to the wireless control processing of the present description. However, the computer-readable medium is not limited to this example, and a portable type storage medium such as a hard disc drive (HDD), a flexible disc, a compact disc read only memory (CD-ROM), a digital versatile disc (DVD), a magneto-optical (MO), a memory card, a universal serial bus (USB) memory, or the like may be used. Moreover, a carrier wave can be used as the medium for providing the data of the program according to the present description via a communication line.

The present description is not limited to the aforementioned embodiments, and various types of modifications are possible. That is, specific details of the configurations, control sequences, or the like indicated in the aforementioned embodiments can be modified appropriately within a scope that does not depart from the gist of the present description.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication apparatus comprising:
   a wireless communicator capable of broadcasting an extended advertising packet having a large transmittable capacity and a compatible advertising packet having a transmittable capacity smaller than the extended advertising packet; and
   a processor,
   wherein:
   the wireless communicator periodically broadcasts the extended advertising packet based on an instruction from the processor,
   the processor (i) sets offset information for acquiring of a time at which the extended advertising packet is receivable in an offset notification packet that is the compatible advertising packet, and (ii) broadcasts the offset notification packet via the wireless communicator, and the offset information is set based on a transmission timing of the offset notification packet and a transmission timing of the extended advertising packet.

2. The wireless communication apparatus according to claim 1, wherein the offset information indicates a time, after the transmission timing of the offset notification packet, up until transmission of an immediately following extended advertising packet.

3. The wireless communication apparatus according to claim 1, wherein the processor broadcasts, via the wireless communicator, a transmission frequency notification packet setting in the compatible advertising packet, the transmission frequency notification packet setting comprising information of a transmission frequency of the offset notification packet.

4. The wireless communication apparatus according to claim 1, wherein the offset notification packet comprises one of ADV_NONCONN_IND and ADV_SCAN_IND.

5. A wireless communication method for execution by a wireless communication apparatus capable of broadcasting an extended advertising packet having a large transmittable capacity and a compatible advertising packet having a transmittable capacity smaller than the extended advertising packet, the method comprising:

setting offset information for acquiring of a time at which the extended advertising packet is receivable in an offset notification packet that is the compatible advertising packet; and broadcasting the offset notification packet, wherein the offset information is set based on a transmission timing of the offset notification packet and a transmission timing of the extended advertising packet.

6. The wireless communication method according to claim 5, wherein the offset information indicates a time, after the transmission timing of the offset notification packet, up until transmission of an immediately following extended advertising packet.

7. The wireless communication method according to claim 5, wherein a transmission frequency notification packet that is the compatible advertising packet in which information on a transmission frequency of the offset notification packet is set is broadcast via a wireless communicator.

8. A non-transitory computer-readable storage medium recording a program of a wireless communication apparatus capable of broadcasting an extended advertising packet having a large transmittable capacity and a compatible advertising packet having a smaller transmittable capacity than the extended advertising packet, the program causing a computer to perform functions comprising:

setting offset information for acquiring of a time at which the extended advertising packet is receivable in an offset notification packet that is the compatible advertising packet; and broadcasting the offset notification packet, wherein the offset information is set based on a transmission timing of the offset notification packet and a transmission timing of the extended advertising packet.

9. The non-transitory computer-readable storage medium according to claim 8, wherein the offset information indicates a time, after the transmission timing of the offset notification packet, up until transmission of an immediately following extended advertising packet.

10. The non-transitory computer-readable storage medium according to claim 8, wherein a transmission frequency notification packet setting in the compatible advertising packet information is broadcast via a wireless communicator, the transmission frequency notification packet setting comprising information of a transmission frequency of the offset notification packet.

* * * * *